United States Patent
Arai et al.

(10) Patent No.: US 10,930,912 B2
(45) Date of Patent: Feb. 23, 2021

(54) COMPOSITION FOR NON-AQUEOUS SECONDARY BATTERY FUNCTIONAL LAYER, FUNCTIONAL LAYER FOR NON-AQUEOUS SECONDARY BATTERY, NON-AQUEOUS SECONDARY BATTERY, AND METHOD OF PRODUCING ELECTRODE FOR NON-AQUEOUS SECONDARY BATTERY

(71) Applicant: ZEON CORPORATION, Tokyo (JP)

(72) Inventors: Kenji Arai, Tokyo (JP); Keiichiro Tanaka, Tokyo (JP); Kazuki Asai, Tokyo (JP)

(73) Assignee: ZEON CORPORATION, Tokyo (JP)

(*) Notice: Subject to any disclaimer, the term of this patent is extended or adjusted under 35 U.S.C. 154(b) by 95 days.

(21) Appl. No.: 16/323,624

(22) PCT Filed: Aug. 2, 2017

(86) PCT No.: PCT/JP2017/028119
§ 371 (c)(1),
(2) Date: Feb. 6, 2019

(87) PCT Pub. No.: WO2018/037867
PCT Pub. Date: Mar. 1, 2018

(65) Prior Publication Data
US 2019/0207189 A1 Jul. 4, 2019

(30) Foreign Application Priority Data

Aug. 25, 2016 (JP) ............................. JP2016-165047

(51) Int. Cl.
*H01M 2/16* (2006.01)
*H01M 4/1391* (2010.01)
*H01M 10/0525* (2010.01)
*H01M 10/0585* (2010.01)
*H01M 4/62* (2006.01)
*H01M 4/139* (2010.01)
*H01M 4/13* (2010.01)
*H01M 10/42* (2006.01)

(52) U.S. Cl.
CPC ........... *H01M 2/1653* (2013.01); *H01M 2/16* (2013.01); *H01M 4/13* (2013.01); *H01M 4/139* (2013.01); *H01M 4/1391* (2013.01); *H01M 4/62* (2013.01); *H01M 4/622* (2013.01); *H01M 10/0525* (2013.01); *H01M 10/0585* (2013.01); *H01M 10/4235* (2013.01)

(58) Field of Classification Search
CPC ........ H01M 2/1653; H01M 2/16; H01M 4/62; H01M 4/139; H01M 4/13; H01M 4/1391; H01M 4/622; H01M 10/0525; H01M 10/4235; H01M 10/0585; H01M 2/166; H01M 2/1673; H01M 2/1686; H01M 10/052
See application file for complete search history.

(56) References Cited

U.S. PATENT DOCUMENTS

| | | | |
|---|---|---|---|
| 2013/0273421 A1 | 10/2013 | Matsumura et al. | |
| 2016/0036055 A1* | 2/2016 | Yamamoto | H01M 4/386 429/217 |
| 2016/0079007 A1* | 3/2016 | Otsuka | H01M 2/1653 429/246 |
| 2017/0155107 A1* | 6/2017 | Akiike | H01M 4/13 |

FOREIGN PATENT DOCUMENTS

| | | |
|---|---|---|
| JP | 2004303473 A | 10/2004 |
| JP | 2013145763 A | 7/2013 |
| JP | 2016122611 A | 7/2016 |
| WO | 2012046843 A1 | 4/2012 |
| WO | 2014157715 A1 | 10/2014 |

OTHER PUBLICATIONS

Dec. 17, 2019, the Extended European Search Report issued by the European Patent Office in the corresponding European Patent Application No. 17843353.8.
Feb. 26, 2019, International Preliminary Report on Patentability issued in the International Patent Application No. PCT/JP2017/028119.
Sep. 5, 2017, International Search Report issued in the International Patent Application No. PCT/JP2017/028119.

\* cited by examiner

*Primary Examiner* — Muhammad S Siddiquee
(74) *Attorney, Agent, or Firm* — Kenja IP Law PC

(57) ABSTRACT

Provided is a composition for a non-aqueous secondary battery functional layer capable of forming a functional layer for a non-aqueous secondary battery that has excellent adhesiveness after immersion in electrolyte solution and can cause a non-aqueous secondary battery to display excellent cycle characteristics and output characteristics. The composition for a non-aqueous secondary battery functional layer contains organic particles and a binder for a functional layer. The organic particles have an electrolyte solution elution amount of at least 0.001 mass % and not more than 5.0 mass %.

10 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, NON-AQUEOUS SECONDARY BATTERY, AND METHOD OF PRODUCING ELECTRODE FOR NON-AQUEOUS SECONDARY BATTERY

TECHNICAL FIELD

The present disclosure relates to a composition for a non-aqueous secondary battery functional layer, a functional layer for a non-aqueous secondary battery, a non-aqueous secondary battery, and a method of producing an electrode for a non-aqueous secondary battery including a functional layer for a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from one another and prevents short circuiting between the positive and negative electrodes.

Battery members including functional layers for imparting desired performance (for example, heat resistance or strength) on these battery members are used in secondary batteries. Specifically, a separator obtained by forming a functional layer on a separator substrate or an electrode obtained by forming a functional layer on an electrode substrate including an electrode mixed material layer on a current collector may, for example, be used as a battery member. Moreover, a functional layer composed of a porous membrane layer formed by binding non-conductive particles using a binder is one example of a functional layer that can improve heat resistance, strength, or the like of a battery member. This functional layer can be formed, for example, by applying a composition for a functional layer that contains non-conductive particles and a binder onto the surface of a substrate (for example, a separator substrate or an electrode substrate), and then drying the applied composition for a functional layer.

In recent years, much effort has been focused on enhancing compositions for non-aqueous secondary battery functional layers used in the formation of functional layers with the aim of further raising secondary battery performance.

In one specific example, PTL 1 discloses a technique that can inhibit detachment of non-conductive organic particles from a porous membrane (i.e., dusting) and can improve flexibility of the porous membrane by forming the porous membrane using a slurry for a secondary battery porous membrane that contains a binder including a polymerized unit of a vinyl monomer having a hydrophilic acidic group, non-conductive organic particles having a functional group that is crosslinkable with a hydrophilic acidic group, and a solvent.

CITATION LIST

Patent Literature

PTL 1: WO 2012/046843 A1

SUMMARY

Technical Problem

There is demand for a functional layer to cause a secondary battery to display excellent battery characteristics (cycle characteristics, output characteristics, etc.). However, it has not been possible to cause a secondary battery to display excellent battery characteristics using a functional layer formed with the composition for a functional layer described in PTL 1. For example, the organic particles that are used in the composition for a functional layer of PTL 1 readily elute into electrolyte solution and may not be able to sufficiently maintain their shape. Consequently, there have been instances in which a functional layer formed using the composition for a functional layer has not been able to display sufficient adhesiveness in electrolyte solution and in which battery characteristics of a non-aqueous secondary battery (particularly cycle characteristics) have deteriorated.

In other words, there is room for improvement of the composition for a functional layer described in PTL 1 in terms of increasing functional layer adhesiveness after immersion in electrolyte solution and causing a secondary battery to display excellent battery characteristics.

Accordingly, one objective of the present disclosure is to provide a composition for a non-aqueous secondary battery functional layer capable of forming a functional layer for a non-aqueous secondary battery that has excellent adhesiveness after immersion in electrolyte solution and can cause a non-aqueous secondary battery to display excellent cycle characteristics and output characteristics.

Another objective of the present disclosure is to provide a functional layer for a non-aqueous secondary battery that can cause a non-aqueous secondary battery to display excellent cycle characteristics and output characteristics.

Another objective of the present disclosure is to provide a non-aqueous secondary battery having excellent cycle characteristics and output characteristics.

Another objective of the present disclosure is to provide a method of producing an electrode for a non-aqueous secondary battery that can cause a non-aqueous secondary battery to display excellent cycle characteristics and output characteristics.

Solution to Problem

The inventors conducted diligent investigation with the aim of solving the problems set forth above. Through this investigation, the inventors discovered that by using a composition for a functional layer that contains, as non-conductive particles, organic particles for which the amount of elution into electrolyte solution under specific conditions (hereinafter referred to as the "electrolyte solution elution amount") is within a specific range, adhesiveness of an obtained functional layer after immersion in electrolyte solution and battery characteristics of a secondary battery can both be improved.

Specifically, the present disclosure aims to advantageously solve the problems set forth above by disclosing a composition for a non-aqueous secondary battery functional layer comprising organic particles and a binder for a functional layer, wherein the organic particles have an electrolyte solution elution amount of at least 0.001 mass % and not more than 5.0 mass %. When organic particles having an electrolyte solution elution amount within the range set forth above are used as non-conductive particles in this manner, a functional layer that has excellent adhesiveness after immersion in electrolyte solution can be obtained. Moreover, a secondary battery can be caused to display excellent cycle characteristics and output characteristics by using this functional layer.

Note that the "electrolyte solution elution amount" of organic particles referred to in the present disclosure can be measured by a method described in the EXAMPLES section of the present specification.

In the presently disclosed composition for a non-aqueous secondary battery functional layer, the organic particles preferably include a crosslinkable monomer unit in a proportion of at least 5.0 mass % and not more than 85 mass %. When the organic particles include a crosslinkable monomer unit in the proportion set forth above, functional layer adhesiveness after immersion in electrolyte solution can be further increased, and secondary battery cycle characteristics and output characteristics can be further improved.

The phrase "includes a monomer unit" as used in relation to a polymer such as organic particles in the present disclosure means that "a structural unit derived from that monomer is included in the polymer obtained using that monomer".

In the presently disclosed composition for a non-aqueous secondary battery functional layer, the organic particles preferably have a volume-average particle diameter $D_A$ of at least 0.01 μm and not more than 2.0 μm. When the volume-average particle diameter $D_A$ (D50) of the organic particles is within the range set forth above, deposition of metal, such as lithium, at an electrode surface can be inhibited, and secondary battery cycle characteristics and output characteristics can be further improved.

The "volume-average particle diameter" of organic particles referred to in the present disclosure can be measured by a method described in the EXAMPLES section of the present specification.

In the presently disclosed composition for a non-aqueous secondary battery functional layer, content of the organic particles is preferably at least 1 mass % and not more than 99 mass % of total content of the organic particles and the binder for a functional layer. When the proportion constituted by content of the organic particles among total content of the organic particles and the binder for a functional layer is within the range set forth above, functional layer adhesiveness before immersion in electrolyte solution can be ensured and dusting can be inhibited while also inhibiting sticking of battery members through a functional layer during storage or transportation of a battery member including a functional layer (i.e., blocking resistance of a battery member including a functional layer can be improved). In addition, deposition of metal, such as lithium, at an electrode surface can be inhibited, and secondary battery cycle characteristics and output characteristics can be further improved.

In the presently disclosed composition for a non-aqueous secondary battery functional layer, volume-average particle diameter $D_A$ of the organic particles is preferably greater than or equal to volume-average particle diameter $D_B$ of the binder for a functional layer. When the volume-average particle diameter $D_A$ (D50) of the organic particles and the volume-average particle diameter $D_B$ (D50) of the binder for a functional layer satisfy the relationship set forth above, blocking resistance of a battery member including a functional layer can be increased, and functional layer adhesiveness after immersion in electrolyte solution can be further improved. Moreover, secondary battery cycle characteristics and output characteristics can be further improved.

The "volume-average particle diameter" of a binder for a functional layer referred to in the present disclosure can be measured by a method described in the EXAMPLES section of the present specification.

The presently disclosed composition for a non-aqueous secondary battery functional layer preferably further comprises inorganic particles. When organic particles having a specific electrolyte solution elution amount and inorganic particles are used together as non-conductive particles, blocking resistance of a battery member including a functional layer can be increased, and functional layer heat resistance can be improved.

Moreover, the present disclosure aims to advantageously solve the problems set forth above by disclosing a functional layer for a non-aqueous secondary battery formed using any one of the compositions for a non-aqueous secondary battery functional layer set forth above. A functional layer formed using the composition for a functional layer set forth above has excellent adhesiveness after immersion in electrolyte solution and can cause a secondary battery to display excellent cycle characteristics and output characteristics.

Furthermore, the present disclosure aims to advantageously solve the problems set forth above by disclosing a non-aqueous secondary battery comprising the functional layer for a non-aqueous secondary battery set forth above. A secondary battery including the functional layer set forth above has excellent battery characteristics such as cycle characteristics and output characteristics.

The presently disclosed non-aqueous secondary battery is preferably a laminate type. When the presently disclosed non-aqueous secondary battery is a laminate type, volume energy density can be improved, and battery characteristics such as cycle characteristics and output characteristics can be further improved.

Also, the present disclosure aims to advantageously solve the problems set forth above by disclosing a method of producing an electrode for a non-aqueous secondary battery comprising: stacking the functional layer for a non-aqueous secondary battery set forth above and an electrode substrate; and adhering the functional layer for a non-aqueous secondary battery set forth above and the electrode substrate through pressing. A large electrode that causes a secondary battery to display excellent cycle characteristics and output characteristics can be quickly and efficiently produced by a procedure such as set forth above.

In the presently disclosed method of producing an electrode for a non-aqueous secondary battery, it is preferable that the electrode substrate contains a binder for an electrode mixed material layer, and the binder for an electrode mixed material layer includes an aromatic vinyl monomer unit and an aliphatic conjugated diene monomer unit. When the electrode is produced using a binder for an electrode mixed material layer that includes an aromatic vinyl monomer unit and an aliphatic conjugated diene monomer unit, secondary battery cycle characteristics and output characteristics can be further improved.

Advantageous Effect

According to the present disclosure, it is possible to provide a composition for a non-aqueous secondary battery functional layer capable of forming a functional layer for a non-aqueous secondary battery that has excellent adhesiveness after immersion in electrolyte solution and can cause a non-aqueous secondary battery to display excellent cycle characteristics and output characteristics.

Moreover, according to the present disclosure, it is possible to provide a functional layer for a non-aqueous secondary battery that can cause a non-aqueous secondary battery to display excellent cycle characteristics and output characteristics.

Furthermore, according to the present disclosure, it is possible to provide a non-aqueous secondary battery having excellent cycle characteristics and output characteristics.

Also, according to the present disclosure, it is possible to provide a method of producing an electrode for a non-aqueous secondary battery that can cause a non-aqueous secondary battery to display excellent cycle characteristics and output characteristics.

DETAILED DESCRIPTION

The following provides a detailed description of embodiments of the present disclosure.

The presently disclosed composition for a non-aqueous secondary battery functional layer is used as a material in production of a functional layer for a non-aqueous secondary battery. Moreover, the presently disclosed functional layer for a non-aqueous secondary battery is formed using the presently disclosed composition for a non-aqueous secondary battery functional layer. Furthermore, the presently disclosed non-aqueous secondary battery includes at least the presently disclosed functional layer for a non-aqueous secondary battery. Also, the presently disclosed method of producing an electrode for a non-aqueous secondary battery is used in production of an electrode for a non-aqueous secondary battery that includes the presently disclosed functional layer for a non-aqueous secondary battery.

(Composition for Non-Aqueous Secondary Battery Functional Layer)

The presently disclosed composition for a functional layer is a slurry composition that has water or the like as a dispersion medium, that contains organic particles as non-conductive particles and a binder for a functional layer, and that may optionally further contain inorganic particles as non-conductive particles and other components (additives, etc.) that can be contained in functional layers. A feature of the presently disclosed composition for a functional layer is that the organic particles have an electrolyte solution elution amount of at least 0.001 mass % and not more than 5.0 mass %.

Wettability with electrolyte solution can be preserved as a result of the organic particles contained in the presently disclosed composition for a functional layer having an electrolyte solution elution amount of 0.001 mass % or more. On the other hand, the organic particles do not excessively elute into electrolyte solution and can sufficiently retain their shape even after long-term immersion in electrolyte solution as a result of having an electrolyte solution elution amount of 5.0 mass % or less. Consequently, a functional layer that is formed using the presently disclosed composition for a functional layer containing the organic particles having an electrolyte solution elution amount within the range set forth above can display excellent adhesiveness even after immersion in electrolyte solution and can improve secondary battery cycle characteristics and output characteristics.

<Organic Particles>

The organic particles are particles used as non-conductive particles that can increase functional layer heat resistance and strength and are normally formed from a polymer that does not have binding ability. The non-conductive particles are electrochemically stable and are, therefore, present stably in a functional layer in the environment of use of a secondary battery.

[Properties of Organic Particles]

The electrolyte solution elution amount of the organic particles is required to be at least 0.001 mass % and not more than 5.0 mass %, is preferably 0.005 mass % or more, more preferably 0.01 mass % or more, even more preferably 0.1 mass % or more, and particularly preferably 0.7 mass % or more, and is preferably 4.5 mass % or less, more preferably 4.0 mass % or less, and even more preferably 3.7 mass % or less. If the electrolyte solution elution amount of the organic particles is less than the lower limit set forth above, wettability of the organic particles with electrolyte solution cannot be ensured, and secondary battery output characteristics deteriorate. On the other hand, if the electrolyte solution elution amount of the organic particles is more than the upper limit set forth above, it becomes difficult for the organic particles to sufficiently maintain their shape in electrolyte solution, and functional layer adhesiveness after immersion in electrolyte solution cannot be ensured. This results in deterioration of secondary battery cycle characteristics. Moreover, blocking resistance tends to decrease if the electrolyte solution elution amount of the organic particles is more than the upper limit set forth above, though the cause of this decrease is not clear.

The electrolyte solution elution amount of the organic particles can be adjusted by altering the chemical composition of the organic particles. For example, the electrolyte solution elution amount can be decreased by increasing the percentage content of a crosslinkable monomer unit in the organic particles and can be increased by decreasing the percentage content of the crosslinkable monomer unit. Moreover, the use of a dispersion stabilizer in polymerization of organic particles including a crosslinkable monomer unit can further decrease the electrolyte solution elution amount. In another example, the electrolyte solution elution amount can be decreased by decreasing the percentage content of an epoxy group-containing monomer unit and/or an alkoxysilyl group-containing monomer unit in the organic particles and can be increased by increasing the percentage content of the epoxy group-containing monomer unit and/or the alkoxysilyl group-containing monomer unit.

The volume-average particle diameter $D_A$ (D50) of the organic particles is preferably 0.01 μm or more, more preferably 0.03 μm or more, even more preferably 0.05 μm or more, and further preferably 0.1 μm or more, and is preferably 2.0 μm or less, more preferably 1.0 μm or less, and even more preferably 0.6 μm or less. When the volume-average particle diameter $D_A$ of the organic particles is at least any of the lower limits set forth above, an increase in the Gurley value of a functional layer (i.e., a decrease in ion conductivity) can be inhibited, deposition of metal, such as lithium, on an electrode can be inhibited, and secondary battery cycle characteristics and output characteristics can be further improved. On the other hand, secondary battery output characteristics can be further improved when the volume-average particle diameter $D_A$ of the organic particles is not more than any of the upper limits set forth above.

The volume-average particle diameter $D_A$ of the organic particles is preferably greater than or equal to the volume-average particle diameter $D_B$ of the subsequently described binder for a functional layer, and is more preferably greater than the volume-average particle diameter $D_B$. When the volume-average particle diameter $D_A$ of the organic particles is greater than or equal to the volume-average particle diameter $D_B$ of the binder for a functional layer, blocking resistance of a battery member including a functional layer can be increased, and functional layer adhesiveness after immersion in electrolyte solution can further be improved. Secondary battery cycle characteristics and output characteristics can also be further improved.

The glass-transition temperature of the organic particles is preferably 30° C. or higher, and more preferably 50° C. or higher. When the glass-transition temperature of the organic particles is at least any of the lower limits set forth above, deformation of the organic particles during secondary battery operation can be inhibited, and functional layer heat resistance and strength can be ensured. The glass-transition temperature of the organic particles is normally 250° C. or lower but is not specifically limited thereto.

The "glass-transition temperature" of organic particles referred to in the present disclosure can be measured by differential scanning calorimetry in accordance with JIS K7121.

[Chemical Composition of Organic Particles]

Although no specific limitations are placed on the chemical composition of the organic particles, which are formed by a polymer, it is preferable that the organic particles include a crosslinkable monomer unit. The organic particles may include monomer units other than the crosslinkable monomer unit (hereinafter also referred to as "other monomer units").

—Crosslinkable Monomer Unit—

Monomers including two or more polymerizable double bonds (for example, olefinic double bonds) per molecule can be used as crosslinkable monomers for forming a crosslinkable monomer unit. Examples of crosslinkable monomers that may be used include difunctional crosslinkable monomers, trifunctional crosslinkable monomers, and tetrafunctional crosslinkable monomers.

Examples of difunctional crosslinkable monomers include ethylene glycol di(meth)acrylate, diethylene glycol di(meth)acrylate, triethylene glycol di(meth)acrylate, tetraethylene glycol di(meth)acrylate, 1,3-butylene glycol di(meth)acrylate, 1,4-butylene glycol di(meth)acrylate, 1,6-hexanediol di(meth)acrylate, neopentyl glycol di(meth)acrylate, polypropylene glycol di(meth)acrylate (preferably having a molecular weight of 500 to 1,200), 2,2-bis(4-(acryloxypropyloxy)phenyl)propane, 2,2-bis(4-(acryloxydiethoxy)phenyl)propane, dipropylene glycol diallyl ether, diethylene glycol diallyl ether, triethylene glycol divinyl ether, trimethylolpropane diallyl ether, methylenebisacrylamide, divinylbenzene, and allyl (meth)acrylate.

Examples of trifunctional crosslinkable monomers include triallylamine and trimethylolpropane tri(meth)acrylate.

Examples of tetrafunctional crosslinkable monomers include tetraallyloxyethane, tetramethylolmethane tri(meth)acrylate, di(trimethylolpropane) tetra(meth)acrylate, tetramethylolmethane tetra(meth)acrylate, and pentaerythritol tetra(meth)acrylate.

In the present disclosure, "(meth)acrylate" is used to indicate "acrylate" and/or "methacrylate".

One of these crosslinkable monomers may be used individually, or two or more of these crosslinkable monomers may be used in combination. Of these crosslinkable monomers, divinylbenzene, ethylene glycol dimethacrylate, and trimethylolpropane trimethacrylate are preferable, and divinylbenzene is more preferable from a viewpoint of further improving functional layer adhesiveness after immersion in electrolyte solution and secondary battery cycle characteristics and output characteristics.

The proportion in which the crosslinkable monomer unit is included in the organic particles when the amount of all monomer units is taken to be 100 mass % is preferably 5.0 mass % or more, more preferably 10 mass % or more, even more preferably 15 mass % or more, and particularly preferably 60 mass % or more, and is preferably 85 mass % or less, more preferably 80 mass % or less, and even more preferably 75 mass % or less. When the proportion in which the crosslinkable monomer unit is included in the organic particles is at least any of the lower limits set forth above, the electrolyte solution elution amount of the organic particles decreases, and the organic particles can sufficiently maintain their shape in electrolyte solution. Functional layer adhesiveness after immersion in electrolyte solution and secondary battery cycle characteristics can be further improved as a result. On the other hand, when the proportion in which the crosslinkable monomer unit is included in the organic particles is not more than any of the upper limits set forth above, wettability of the organic particles with electrolyte solution increases, and secondary battery output characteristics can be further improved.

—Other Monomer Units—

Examples of monomer units other than the crosslinkable monomer unit that may be included in the organic particles include, but are not specifically limited to, an aromatic monovinyl monomer unit, a (meth)acrylic acid ester monomer unit, an acid group-containing monomer unit, a hydroxy group-containing monomer unit, an epoxy group-containing monomer unit, and an alkoxysilyl group-containing monomer unit. These other monomer units are monomer units other than crosslinkable monomer units such as set forth above. Therefore, monomers corresponding to the crosslinkable monomers set forth above are not included among other monomers that can be used to form these other monomers units.

In the present disclosure, "(meth)acryl" is used to indicate "acryl" and/or "methacryl".

Examples of aromatic monovinyl monomers that may be used to form the aromatic monovinyl monomer unit include styrene, α-methylstyrene, vinyltoluene, 4-(tert-butoxy)styrene, ethylvinylbenzene, fluorostyrene, and vinylpyridine. One of these aromatic monovinyl monomers may be used individually, or two or more of these aromatic monovinyl monomers may be used in combination. Of these aromatic monovinyl monomers, styrene and ethylvinylbenzene are preferable.

The proportion in which the aromatic monovinyl monomer unit is included in the organic particles when the amount of all monomer units is taken to be 100 mass % is preferably 5.0 mass % or more, more preferably 10 mass % or more, and even more preferably 15 mass % or more, and is preferably 90 mass % or less, more preferably 70 mass % or less, and even more preferably 40 mass % or less. When the proportion in which the aromatic monovinyl monomer unit is included in the organic particles is within any of the ranges set forth above, the organic particles can sufficiently maintain their shape in electrolyte solution, and functional layer adhesiveness after immersion in electrolyte solution and secondary battery cycle characteristics can be further improved.

Examples of (meth)acrylic acid ester monomers that may be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One of these (meth)acrylic acid ester monomers may be used individually, or two or more of these (meth)acrylic acid ester monomers may be used in combination. Of these (meth)acrylic acid ester monomers, n-butyl acrylate and methyl methacrylate are preferable.

The proportion in which the (meth)acrylic acid ester monomer unit is included in the organic particles when the amount of all monomer units is taken to be 100 mass % is preferably 0.1 mass % or more, more preferably 0.5 mass % or more, and even more preferably 1.0 mass % or more, and is preferably 60 mass % or less, more preferably 20 mass % or less, even more preferably 5.0 mass % or less, and particularly preferably 4.0 mass % or less. When the proportion in which the (meth)acrylic acid ester monomer unit is included in the organic particles is within any of the ranges set forth above, functional layer flexibility and adhesiveness after immersion in electrolyte solution can be ensured, and secondary battery cycle characteristics can be further improved.

Examples of acid group-containing monomers that may be used to form the acid group-containing monomer unit include monomers having an acid groups such as carboxy group-containing monomers, sulfo group-containing monomers, and phosphate group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)allyl" is used to indicate "allyl" and/or "methallyl", and "(meth)acryloyl" is used to indicate "acryloyl" and/or "methacryloyl".

One of these acid group-containing monomers may be used individually, or two or more of these acid group-containing monomers may be used in combination. Of these acid group-containing monomers, carboxy group-containing monomers are preferable, monocarboxylic acids are more preferable, and (meth)acrylic acid is even more preferable.

The proportion in which the acid group-containing monomer unit is included in the organic particles when the amount of all monomer units is taken to be 100 mass % is preferably 0.2 mass % or more, more preferably 1.0 mass % or more, and even more preferably 1.5 mass % or more, and is preferably 10 mass % or less, more preferably 8.0 mass % or less, and even more preferably 6.0 mass % or less. When the proportion in which the acid group-containing monomer unit is included in the organic particles is within any of the ranges set forth above, aggregation of the organic particles can be inhibited, functional layer residual water content can be decreased, and secondary battery cycle characteristics and output characteristics can be further improved.

Examples of hydroxy group-containing monomers that may be used to form the hydroxy group-containing monomer unit include 2-hydroxyethyl acrylate, 2-hydroxyethyl methacrylate, 2-hydroxypropyl acrylate, 2-hydroxypropyl methacrylate, N-hydroxymethylacrylamide (N-methylolacrylamide), N-hydroxymethylmethacrylamide, N-hydroxyethylacrylamide, and N-hydroxyethylmethacrylamide. One of these hydroxy group-containing monomers may be used individually, or two or more of these hydroxy group-containing monomers may be used in combination. Of these hydroxy group-containing monomers, 2-hydroxyethyl methacrylate is preferable.

The proportion in which the hydroxy group-containing monomer unit is included in the organic particles when the amount of all monomer units is taken to be 100 mass % is preferably 0.1 mass % or more, and more preferably 0.3 mass % or more, and is preferably 3.0 mass % or less, more preferably 2.0 mass % or less, and even more preferably 1.0 mass % or less.

Examples of epoxy group-containing monomers that may be used to form the epoxy group-containing monomer unit include those described as "monomers having an epoxy group" in WO 2012/046843 A1. One of these epoxy group-containing monomers may be used individually, or two or more of these epoxy group-containing monomers may be used in combination. The use of organic particles that include an epoxy group-containing monomer unit enables formation of a functional layer that has excellent flexibility and for which dusting is inhibited. On the other hand, organic particles including an epoxy group-containing monomer unit tend to have higher wettability with electrolyte solution and a higher electrolyte solution elution amount. Consequently, the use of organic particles that include an epoxy group-containing monomer unit may decrease functional layer adhesiveness after immersion in electrolyte solution and cause deterioration of secondary battery cycle characteristics. Accordingly, the proportion in which the epoxy group-containing monomer unit is included in the organic particles when the amount of all monomer units is taken to be 100 mass % is preferably less than 0.4 mass %, more preferably less than 0.2 mass %, and even more preferably less than 0.1 mass % from a viewpoint of further improving functional layer adhesiveness after immersion in electrolyte solution and secondary battery cycle characteristics.

Examples of alkoxysilyl group-containing monomers that may be used to form the alkoxysilyl group-containing monomer unit include those described as "monomers having an alkoxysilyl group" in WO 2012/046843 A1. One of these alkoxysilyl group-containing monomers may be used individually, or two or more of these alkoxysilyl group-containing monomers may be used in combination. The use of organic particles that include an alkoxysilyl group-containing monomer unit enables formation of a functional layer that has excellent flexibility and for which dusting is inhibited. On the other hand, organic particles including an alkoxysilyl group-containing monomer unit tend to have higher wettability with electrolyte solution and a higher electrolyte solution elution amount. Consequently, the use of organic particles that include an alkoxysilyl group-containing monomer unit may decrease functional layer adhesiveness after immersion in electrolyte solution and cause deterioration of secondary battery cycle characteristics.

Accordingly, the proportion in which the alkoxysilyl group-containing monomer unit is included in the organic particles when the amount of all monomer units is taken to be 100 mass % is preferably less than 1.7 mass %, more preferably less than 0.4 mass %, even more preferably less than 0.2 mass %, and particularly preferably less than 0.1 mass % from a viewpoint of further improving functional layer adhesiveness after immersion in electrolyte solution and secondary battery cycle characteristics.

Besides the monomers that may be used to form the monomer units set forth above, other known monomers such as nitrile group-containing monomers, aliphatic conjugated diene monomers, and vinyl acetate may be used in production of the organic particles.

[Production Method of Organic Particles]

The organic particles may be produced through polymerization of a monomer composition containing the monomers set forth above, performed in an aqueous solvent such as water, for example. In the polymerization, the percentage content of each monomer in the monomer composition can be set in accordance with the percentage content of each repeating unit (monomer unit) in the organic particles.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization. In the polymerization, seed particles may be used to perform seeded polymerization. The polymerization conditions can be adjusted as appropriate depending on the polymerization method and so forth.

Moreover, additives such as emulsifiers, polymerization initiators, polymerization aids, dispersion stabilizers, and co-stabilizers may be used in polymerization.

Examples of emulsifiers, polymerization initiators, and polymerization aids that may be used include the same as are typically used and the amount thereof may also be the same as typically used.

Examples of dispersion stabilizers that may be used include, but are not specifically limited to, polymers including at least one selected from the group consisting of a hydroxy group, a carbonyl group, an amino group, and an epoxy group (however, polymers corresponding to the organic particles and the binder for a functional layer are excluded). Examples of such dispersion stabilizers include polyvinyl alcohol, carboxymethyl cellulose, polyacrylic acid salts, rosin resin, polyvinyl pyrrolidone, and poly(meth)acrylic acid esters. Of these dispersion stabilizers, stabilizers that are water-soluble are preferable, and stabilizers that are both water-soluble and non-ionic are preferable. Examples of dispersion stabilizers that are both water-soluble and non-ionic include polyvinyl alcohol and polyvinyl pyrrolidone. Although the amount of dispersion stabilizer that is used is not specifically limited, the amount per 100 parts by mass of monomer used in polymerization (inclusive of monomer used to produce seed particles in a case in which the organic particles are produced by seeded polymerization) is preferably at least 0.1 parts by mass and not more than 30 parts by mass, and more preferably at least 0.8 parts by mass and not more than 25 parts by mass. If the amount of dispersion stabilizer that is used falls below the lower limit set forth above, polymerization stability may deteriorate, and the electrolyte solution elution amount may increase. On the other hand, if the amount of dispersion stabilizer that is used exceeds the upper limit set forth above, problems such as coloring of the resultant organic particles may arise.

In a case in which a crosslinkable monomer is used in production of the organic particles, a co-stabilizer may be used in addition to the dispersion stabilizer. The use of a co-stabilizer can increase dispersion stability of a crosslinkable monomer, in particular, and can cause polymerization to proceed with greater stability. Moreover, the use of a co-stabilizer has an effect of improving film formation properties of the composition for a functional layer containing the organic particles and thereby increasing tear resistance of a battery member (particularly a separator) including the obtained functional layer. Examples of such co-stabilizers include anionic surfactants, non-ionic surfactants, quaternary ammonium salts, and long-chain alcohols. Specific examples include di(2-ethylhexyl) sulfosuccinate sodium salt, nonylphenoxy polyethoxyethanol, methyltricaprylammonium chloride, and cetyl alcohol.

<Binder for Functional Layer>

The binder for a functional layer holds components contained in a functional layer, such as the organic particles, so that these components do not become detached from the functional layer. The binder for a functional layer normally includes a polymer having binding ability. A particulate polymer, for example, is preferable as the binder used in the composition for a functional layer. The particulate polymer is normally a water-insoluble polymer. Note that when a polymer is referred to as "water-insoluble" in the present disclosure, this means that when 0.5 g of the polymer is dissolved in 100 g of water at 25° C., insoluble content is 90 mass % or more.

[Properties of Binder for Functional Layer]

The volume-average particle diameter $D_B$ (D50) of the binder for a functional layer (particulate polymer) is preferably 0.01 µm or more, and more preferably 0.05 µm or more, and is preferably 0.5 µm or less, and more preferably 0.35 µm or less. When the volume-average particle diameter $D_B$ of the binder for a functional layer is at least any of the lower limits set forth above, an increase in the Gurley value of a functional layer (i.e., a decrease in ion conductivity) can be inhibited, deposition of metal, such as lithium, on an electrode can be inhibited, and secondary battery cycle characteristics and output characteristics can be further improved. On the other hand, when the volume-average particle diameter $D_B$ of the binder for a functional layer is not more than any of the upper limits set forth above, functional layer adhesiveness before immersion in electrolyte solution can be improved, and dusting can be inhibited.

The glass-transition temperature of the binder for a functional layer is preferably −30° C. or higher, and more preferably −20° C. or higher, and is preferably 20° C. or lower, and more preferably 15° C. or lower. When the glass-transition temperature of the binder for a functional layer is at least any of the lower limits set forth above, blocking resistance of a battery member including a functional layer can be ensured. On the other hand, when the glass-transition temperature of the binder for a functional layer is not higher than any of the upper limits set forth above, the binder for a functional layer displays excellent binding ability, and sufficient functional layer adhesiveness before and after immersion in electrolyte solution can be ensured. Secondary battery cycle characteristics and output characteristics can be further improved as a result.

[Chemical Composition of Binder for Functional Layer]

The particulate polymer serving as the binder for a functional layer is not specifically limited and may be a known particulate polymer that can be used in formation of a functional layer such as a thermoplastic resin, a thermosetting resin, or a synthetic rubber. Specific examples of suitable particulate polymers include a polymer including a conjugated diene monomer unit (conjugated diene polymer) such as styrene-butadiene copolymer (SBR) and a polymer including a (meth)acrylic acid ester monomer unit (acrylic polymer). Of these particulate polymers, an acrylic polymer is more suitable. One of these particulate polymers may be used individually, or two or more of these particulate polymers may be used in combination.

Although the following describes, as one example, a suitable chemical composition of an acrylic polymer that is a particulate polymer, the binder for a functional layer is not limited thereto. The suitable particulate polymer includes a (meth)acrylic acid ester monomer unit and an aromatic monovinyl monomer unit, and may optionally include other monomer units.

—(Meth)Acrylic Acid Ester Monomer Unit—

Examples of (meth)acrylic acid ester monomers that may be used to form the (meth)acrylic acid ester monomer unit include the same (meth)acrylic acid ester monomers as previously described in the "Organic particles" section. One of these (meth)acrylic acid ester monomers may be used individually, or two or more of these (meth)acrylic acid ester monomers may be used in combination. Of these (meth) acrylic acid ester monomers, (meth)acrylic acid alkyl esters in which the carbon number of the alkyl group bonded to the non-carbonyl oxygen atom is 4 or more (2-ethylhexyl acrylate, n-butyl acrylate, t-butyl acrylate, octyl acrylate, etc.) are preferable, and (meth)acrylic acid alkyl esters for which this carbon number is 5 or more (2-ethylhexyl acrylate, octyl acrylate, etc.) are more preferable from a viewpoint of reducing functional layer residual water content and improving secondary battery cycle characteristics.

The proportion in which the (meth)acrylic acid ester monomer unit is included in the particulate polymer when the amount of all monomer units is taken to be 100 mass % is preferably 35 mass % or more, more preferably 40 mass % or more, and even more preferably 45 mass % or more, and is preferably 80 mass % or less, more preferably 75 mass % or less, even more preferably 70 mass % or less, particularly preferably 65 mass % or less, and most preferably 60 mass % or less. When the proportion in which the (meth) acrylic acid ester monomer unit is included in the particulate polymer is within any of the ranges set forth above, binding ability of the particulate polymer increases, and elution of the particulate polymer into electrolyte solution can be inhibited. Secondary battery cycle characteristics and output characteristics can be further improved as a result.

—Aromatic Monovinyl Monomer Unit—

Examples of aromatic monovinyl monomers that may be used to form the aromatic monovinyl monomer unit include the same aromatic monovinyl monomers as previously described in the "Organic particles" section. One of these aromatic monovinyl monomers may be used individually, or two or more of these aromatic monovinyl monomers may be used in combination. Of these aromatic monovinyl monomers, styrene is preferable.

The proportion in which the aromatic monovinyl monomer unit is included in the particulate polymer when the amount of all monomer units is taken to be 100 mass % is preferably 20 mass % or more, more preferably 25 mass % or more, even more preferably 30 mass % or more, and particularly preferably 35 mass % or more, and is preferably 65 mass % or less, more preferably 64.9 mass % or less, even more preferably 60 mass % or less, and particularly preferably 50 mass % or less. When the proportion in which the aromatic monovinyl monomer unit is included in the particulate polymer is within any of the ranges set forth above, elution of the particulate polymer into electrolyte solution can be inhibited, and the amount of water that is imported into a functional layer can be decreased. Consequently, functional layer adhesiveness after immersion in electrolyte solution can be further increased, and secondary battery cycle characteristics and output characteristics can be further improved.

—Other Monomer Units—

Examples of monomer units other than the (meth)acrylic acid ester monomer unit and the aromatic monovinyl monomer unit that may be included in the particulate polymer include, but are not specifically limited to, an acid group-containing monomer unit and a crosslinkable monomer unit.

Examples of acid group-containing monomers that may be used to form the acid group-containing monomer unit include the same acid group-containing monomers as previously described in the "Organic particles" section. One of these acid group-containing monomers may be used individually, or two or more of these acid group-containing monomers may be used in combination. Of these acid group-containing monomers, itaconic acid and maleic acid are preferable from a viewpoint of improving secondary battery output characteristics.

The proportion in which the acid group-containing monomer unit is included in the particulate polymer when the amount of all monomer units is taken to be 100 mass % is preferably 0.1 mass % or more, more preferably 0.2 mass % or more, and even more preferably 0.3 mass % or more, and is preferably 5.0 mass % or less, more preferably 3.0 mass % or less, even more preferably 2.0 mass % or less, and particularly preferably 1.0 mass % or less. When the proportion in which the acid group-containing monomer unit is included in the particulate polymer is at least any of the lower limits set forth above, functional layer adhesiveness after immersion in electrolyte solution can be increased, and secondary battery cycle characteristics and output characteristics can be further improved. On the other hand, when the proportion in which the acid group-containing monomer unit is included is not more than any of the upper limits set forth above, functional layer residual water content can be decreased, and secondary battery cycle characteristics can be further improved.

Examples of crosslinkable monomers that may be used to form the crosslinkable monomer unit include the same crosslinkable monomers as previously described in the "Organic particles" section. One of these crosslinkable monomers may be used individually, or two or more of these crosslinkable monomers may be used in combination. Of these crosslinkable monomers, ethylene glycol dimethacrylate and divinylbenzene are preferable from a viewpoint of decreasing functional layer residual water content and further improving secondary battery cycle characteristics.

The proportion in which the crosslinkable monomer unit is included in the particulate polymer when the amount of all monomer units is taken to be 100 mass % is preferably 0.01 mass % or more, more preferably 0.1 mass % or more, and even more preferably 0.5 mass % or more, and is preferably 5.0 mass % or less, more preferably 4.0 mass % or less, and even more preferably 3.0 mass % or less. When the proportion in which the crosslinkable monomer unit is included in the particulate polymer is at least any of the lower limits set forth above, elution of the binder for a functional layer into electrolyte solution can be inhibited, and functional layer adhesiveness after immersion in electrolyte solution can be further increased. Secondary battery cycle characteristics can be further improved as a result. On the other hand, when the proportion in which the crosslinkable monomer unit is included in the particulate polymer is not more than any of the upper limits set forth above, the binder for a functional layer can display excellent binding ability, and sufficient functional layer adhesiveness before and after immersion in electrolyte solution can be ensured. Secondary battery cycle characteristics and output characteristics can be further improved as a result.

[Production Method of Binder for Functional Layer]

No specific limitations are placed on the method by which the binder for a functional layer is produced. For example, a particulate polymer serving as the binder for a functional layer may be produced through polymerization of a monomer composition containing the monomers set forth above, performed in an aqueous solvent such as water, for example. In the polymerization, the percentage content of each monomer in the monomer composition can be set in accordance with the percentage content of each repeating unit (monomer unit) in the particulate polymer.

No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization.

Typically used additives such as emulsifiers, dispersants, polymerization initiators, and polymerization aids may be used in the polymerization. The amounts of these additives may also be the same as typically used. The polymerization conditions can be adjusted as appropriate depending on the polymerization method, the type of polymerization initiator, and so forth.

[Content Ratio of Organic Particles and Binder for Functional Layer]

Although no specific limitations are placed on the content ratio of the organic particles and the binder for a functional layer in the composition for a functional layer, the content of the organic particles relative to the total content of the organic particles and the binder for a functional layer is preferably 1 mass % or more, preferably 25 mass % or more, more preferably 50 mass % or more, even more preferably 60 mass % or more, and particularly preferably 75 mass % or more, and is preferably 99 mass % or less, more preferably 98 mass % or less, and even more preferably 97 mass % or less. When the proportion constituted by the organic particles among the total of the organic particles and the binder for a functional layer is at least any of the lower limits set forth above, blocking resistance of a battery member including a functional layer can be ensured, and deposition of metal, such as lithium, on an electrode can be inhibited. Secondary battery cycle characteristics and output characteristics can also be further improved. On the other hand, when the proportion constituted by the organic particles among the total of the organic particles and the binder for a functional layer is not more than any of the upper limits set forth above, sufficient functional layer adhesiveness before and after immersion in electrolyte solution can be ensured.

<Inorganic Particles>

In the presently disclosed composition for a functional layer, it is preferable that inorganic particles are used as non-conductive particles in addition to the organic particles set forth above. The combined use of the organic particles and inorganic particles can improve blocking resistance and heat resistance of a battery member including a functional layer.

Examples of inorganic particles that may be used include particles of oxides such as aluminum oxide (alumina), aluminum oxide hydrate (boehmite (AlOOH)), gibbsite (Al(OH)$_3$), silicon oxide, magnesium oxide (magnesia), calcium oxide, titanium oxide (titania), barium titanate (BaTiO$_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Of these inorganic particles, boehmite particles, barium sulfate particles, and alumina particles are preferable.

One of these types of inorganic particles may be used individually, or two or more of these types of inorganic particles may be used in combination.

The volume-average particle diameter (D50) of the inorganic particles is preferably 0.1 μm or more, and more preferably 0.3 μm or more, and is preferably 2.0 μm or less, and more preferably 1.5 μm or less. When the volume-average particle diameter of the inorganic particles is at least any of the lower limits set forth above, an increase in the Gurley value of a functional layer (i.e., a decrease in ion conductivity) can be inhibited, and secondary battery output characteristics can be further improved. On the other hand, when the volume-average particle diameter of the inorganic particles is not more than any of the upper limits set forth above, the density of a functional layer can be increased, and a protective function (for example, heat resistance) of the functional layer can be ensured.

The "volume-average particle diameter of inorganic particles" referred to in the present disclosure can be measured by a method described in the EXAMPLES section of the present specification.

The content of the inorganic particles in the composition for a functional layer per 100 parts by mass of the organic particles is preferably 2 parts by mass or more, and more preferably 5 parts by mass or more, and is preferably 100 parts by mass or less, and more preferably 50 parts by mass or less. When the content of the inorganic particles is at least any of the lower limits set forth above, blocking resistance and heat resistance of a battery member including a functional layer can be further improved. On the other hand, when the content of the inorganic particles is not more than any of the upper limits set forth above, functional layer wettability with electrolyte solution can be ensured, and secondary battery output characteristics can be further improved.

<Additives>

The composition for a functional layer may further contain other optional components in addition to the components set forth above. Commonly known components can be used as these other components without any specific limitations so long as they do not affect the battery reactions. One of such other components may be used individually, or two or more of such other components may be used in combination.

Examples of other components that can be used include known additives such as dispersants and wetting agents.

<Dispersion Medium>

Water is normally used as a dispersion medium in the presently disclosed composition for a functional layer. However, a mixture of water and another solvent may alternatively be used as the dispersion medium. Examples of the other solvent include, but are not specifically limited to, alicyclic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of these other solvents may be used individually, or two or more of these other solvents may be used in combination in a freely selected ratio.

<Production Method of Composition for Non-Aqueous Secondary Battery Functional Layer>

The presently disclosed composition for a functional layer may be obtained by mixing the organic particles, the binder for a functional layer, and the optionally used inorganic particles and additives set forth above in the presence of a dispersion medium such as water, but is not specifically limited to being obtained in this manner.

Although no specific limitations are placed on the mixing method and mixing order of the above-described components, the mixing is preferably performed using a disperser as a mixing device to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

(Functional Layer for Non-Aqueous Secondary Battery)

The presently disclosed functional layer for a non-aqueous secondary battery is a layer that is formed from the composition for a non-aqueous secondary battery functional layer set forth above. The presently disclosed functional layer for a non-aqueous secondary battery can be formed, for example, by applying the above-described composition for a functional layer onto the surface of a suitable substrate to form an applied film, and then drying the applied film that is formed. In other words, the presently disclosed functional layer for a non-aqueous secondary battery is composed of a dried product of the composition for a non-aqueous secondary battery functional layer set forth above, contains organic particles and a binder for a functional layer, and may optionally contain inorganic particles and additives. In a case in which the organic particles and/or binder for a functional layer set forth above include a crosslinkable monomer unit, the polymer including the crosslinkable monomer unit may be crosslinked in drying of the composition for a non-aqueous secondary battery functional layer, or in heat treatment or the like that is optionally performed after the drying (i.e., the functional layer for a non-aqueous secondary battery may contain a crosslinked product of the organic particles and/or binder for a functional layer set forth above).

The presently disclosed functional layer for a non-aqueous secondary battery has excellent adhesiveness after immersion in electrolyte solution as a result of being formed using the composition for a non-aqueous secondary battery functional layer set forth above. Moreover, a secondary battery can be caused to display excellent cycle characteristics and output characteristics using a battery member that includes the presently disclosed functional layer for a non-aqueous secondary battery.

<Substrate>

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery member of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery member production efficiency since a step of peeling the functional layer can be omitted. The functional layer provided on the separator substrate or electrode substrate can suitably be used as a protective layer for improving heat resistance, strength, and so forth of the separator or electrode.

[Separator Substrate]

The separator substrate is not specifically limited and may be an organic separator substrate or the like. The organic separator substrate is a porous member that is made from an organic material. Examples of organic separator substrates include microporous membranes and non-woven fabrics containing a polyolefin resin such as polyethylene or polypropylene, an aromatic polyamide resin, or the like. A microporous membrane or non-woven fabric made from polyethylene is preferable due to having excellent strength. Moreover, a separator substrate made from a mixture (polyethylene composition) containing at least 30 mass % and not more than 70 mass % of ultra-high molecular weight polyethylene having a weight-average molecular weight (Mw) of $1 \times 10^6$ or more and at least 30 mass % and not more than 70 mass % of (high-density) polyethylene for which Mw is at least $1 \times 10^4$ and less than $8 \times 10^5$ is more preferable in order to increase the strength of the separator substrate and thereby stabilize conveyance during functional layer coating. Note that Mw of polyethylene can be measured by gel permeation chromatography (GPC).

Although the separator substrate may be of any thickness, the thickness thereof is preferably at least 3 μm and not more than 30 μm, more preferably at least 4 μm and not more than 20 μm, and even more preferably at least 5 μm and not more than 18 μm. A separator substrate thickness of 3 μm or more can ensure sufficient safety. Moreover, a separator substrate thickness of 30 μm or less can inhibit reduction of ion conductivity, inhibit deterioration of secondary battery low-temperature output characteristics, inhibit increase of heat contraction force of the separator substrate, and increase heat resistance.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and a binder for an electrode mixed material layer (binder for positive/negative electrode mixed material layer) in the electrode mixed material layer, and the method by which the electrode mixed material layer is formed on the current collector are not specifically limited and may, for example, be any of those described in JP 2013-145763 A.

The binder for an electrode mixed material layer is preferably a polymer that includes an aromatic vinyl monomer unit and an aliphatic conjugated diene monomer unit from a viewpoint of further improving secondary battery cycle characteristics and output characteristics. The binder for an electrode mixed material layer including an aromatic vinyl monomer unit and an aliphatic conjugated diene monomer unit preferably further includes a carboxy group-containing monomer unit. Note that the binder for an electrode mixed material layer may include monomer units other than the aromatic vinyl monomer unit, the aliphatic conjugated diene monomer unit, and the carboxy group-containing monomer unit.

Examples of aromatic vinyl monomers that may be used to form the aromatic vinyl monomer unit include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

The proportion in which the aromatic vinyl monomer unit is included in the binder for an electrode mixed material layer when the amount of all monomer units is taken to be 100 mass % is preferably 50 mass % or more, more preferably 55 mass % or more, and even more preferably 60 mass % or more, and is preferably 75 mass % or less, more preferably 70 mass % or less, and even more preferably 65 mass % or less.

Examples of aliphatic conjugated diene monomers that may be used to form the aliphatic conjugated diene monomer unit include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. One of these aliphatic conjugated diene monomers may be used individually, or two or more of these aliphatic conjugated diene monomers may be used in combination. Of these aliphatic conjugated diene monomers, 1,3-butadiene is preferable.

The proportion in which the aliphatic conjugated diene monomer unit is included in the binder for an electrode mixed material layer when the amount of all monomer units is taken to be 100 mass % is preferably 20 mass % or more, more preferably 25 mass % or more, and even more preferably 30 mass % or more, and is preferably 45 mass % or less, more preferably 40 mass % or less, and even more preferably 35 mass % or less.

Examples of carboxy group-containing monomers that may be used to form the carboxy group-containing monomer unit include the same carboxy group-containing monomers as previously described in the "Organic particles" section. One of these carboxy group-containing monomers may be used individually, or two or more of these carboxy group-containing monomers may be used in combination. Of these carboxy group-containing monomers, itaconic acid is preferable.

The proportion in which the carboxy group-containing monomer unit is included in the binder for an electrode mixed material layer when the amount of all monomer units is taken to be 100 mass % is preferably 0.5 mass % or more, more preferably 1 mass % or more, and even more preferably 2 mass % or more, and is preferably 10 mass % or less, more preferably 7 mass % or less, and even more preferably 5 mass % or less.

Examples of monomers that may be used to form other monomer units included in the binder for an electrode mixed material layer include monomers that are copolymerizable with the monomers set forth above. Specific examples of such other monomers include hydroxy group-containing monomers such as 2-hydroxyethyl acrylate; fluorine-containing monomers such as fluorine-containing (meth)acrylic acid ester monomers; sulfuric acid ester group-containing monomers such as acrylamido-2-methylpropane sulfonic acid; amide group-containing monomers such as acrylamide and methacrylamide; crosslinkable monomers such as allyl glycidyl ether, allyl (meth)acrylate, and N-methylolacrylamide; olefins such as ethylene and propylene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; amino-group containing monomers such as aminoethyl vinyl ether and dimethylaminoethyl vinyl ether; and α,β-unsaturated nitrile monomers such as acrylonitrile and methacrylonitrile. One of these other monomers may be used individually, or two or more of these other monomers may be used in combination.

The method by which the binder for an electrode mixed material layer is produced is not specifically limited and may, for example, be the same as any of the methods previously described in the "Production method of binder for functional layer" section.

<Formation Method of Functional Layer for Non-Aqueous Secondary Battery>

Examples of methods by which the functional layer may be formed on a substrate such as the separator substrate or the electrode substrate set forth above include:

(1) a method in which the presently disclosed composition for a functional layer is applied onto the surface of a separator substrate or electrode substrate (surface at the electrode mixed material layer side in the case of an electrode substrate; same applies below) and is then dried;

(2) a method in which a separator substrate or electrode substrate is immersed in the presently disclosed composition for a functional layer and is then dried; and (3) a method in which the presently disclosed composition for a functional layer is applied onto a detachable substrate and is dried to produce a functional layer that is then transferred onto the surface of a separator substrate or electrode substrate.

Of these methods, method (1) is particularly preferable since it allows simple control of layer thickness of the functional layer. More specifically, method (1) includes a step of applying the composition for a functional layer onto a substrate (application step) and a step of drying the composition for a functional layer that has been applied onto the substrate to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The method by which the composition for a functional layer on the substrate is dried in the functional layer formation step is not specifically limited and may be a commonly known method. Examples of drying methods that may be used include drying by warm, hot, or low-humidity air; drying in a vacuum; and drying by irradiation with infrared light, an electron beam, or the like. Although no specific limitations are placed on the drying conditions, the drying temperature is preferably 50° C. to 150° C., and the drying time is preferably 5 minutes to 30 minutes.

<Functional Layer Thickness>

The thickness of the functional layer formed using the presently disclosed composition for a non-aqueous secondary battery functional layer is preferably 0.1 μm or more, and more preferably 0.5 μm or more, and is preferably 5 μm or less, and more preferably 3 μm or less. A functional layer thickness that is at least any of the lower limits set forth above further enhances a protective function of the functional layer and thereby enables improvement of heat resistance and tear resistance of a battery member that includes the functional layer. Moreover, a functional layer thickness that is not more than any of the upper limits set forth above enables a secondary battery to display excellent output characteristics.

(Battery Member Including Functional Layer)

A battery member (separator or electrode) including the presently disclosed functional layer may include elements other than the presently disclosed functional layer set forth above in addition to the separator substrate or electrode substrate and the presently disclosed functional layer so long as the effects disclosed herein are not significantly lost.

These elements other than the presently disclosed functional layer may be any elements that do not correspond to the presently disclosed functional layer, and one example thereof is an adhesive layer for adhering battery members to one another that may be provided on the presently disclosed functional layer.

(Production Method of Electrode for Non-Aqueous Secondary Battery)

An electrode including a functional layer that is one example of a battery member including a functional layer may be produced, for example, by the presently disclosed method of producing an electrode for a non-aqueous secondary battery. The presently disclosed method of producing an electrode for a non-aqueous secondary battery includes a step of stacking the presently disclosed functional layer and an electrode substrate and a step of adhering the presently disclosed functional layer and the electrode substrate through pressing. A large electrode that can cause a secondary battery to display excellent cycle characteristics and output characteristics can be quickly and efficiently produced by such a procedure. No specific limitations are placed on the form of the presently disclosed method of producing an electrode for a non-aqueous secondary battery so long as an electrode that is a pressed laminate of the functional layer and the electrode substrate can be obtained through stacking of the functional layer and the electrode substrate, and adhesion thereof through pressing.

For example, in stacking of the functional layer and the electrode substrate, a free-standing film such as previously described in the "Substrate" section may be used as the functional layer or a functional layer that is disposed on a separator substrate may be used as the functional layer (more specifically, a separator including a functional layer may be stacked with an electrode substrate such that the functional layer of the separator is in contact with the electrode substrate). Note that the electrode substrate may be the same as any of the electrode substrates previously described in the "Substrate" section.

Moreover, in the adhering of the functional layer and the electrode substrate through pressing, the pressing may, for example, be carried out in a battery container in the presence of electrolyte solution (more specifically, an electrode substrate and a separator including a functional layer may be positioned inside a battery container, an electrolyte solution may be injected into the battery container, and pressing may subsequently be performed to adhere the functional layer and the electrode substrate). The adhering of the functional layer and the electrode substrate through pressing may be carried out by a known pressing adhesion technique.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolyte solution, and at least one battery member among the positive electrode, the negative electrode, and the separator includes the functional layer for a non-aqueous secondary battery set forth above. The presently disclosed non-aqueous secondary battery can display excellent battery characteristics (for example, cycle characteristics and output characteristics).

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode that includes a functional layer or a negative electrode that includes a functional layer. Moreover, a separator produced by providing the presently disclosed functional layer on a separator substrate may be used as a separator that includes a functional layer. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer. Furthermore, a separator substrate made from a mixture (polyethylene composition) containing at least 30 mass % and not more than 70 mass % of ultra-high molecular weight polyethylene for which Mw is $1 \times 10^6$ or more and at least 30 mass % and not more than 70 mass % of (high-density) polyethylene for which Mw is at least $1 \times 10^4$ and less than $8 \times 10^5$ as previously described is more preferable.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples of organic solvents that may be used in a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

(Production Method of Non-Aqueous Secondary Battery)

The presently disclosed non-aqueous secondary battery set forth above can be produced by, for example, stacking the positive electrode and the negative electrode with the separator in-between, performing pressure bonding of the resultant laminate as necessary, placing the laminate in a battery container as produced or after rolling, folding, or the like, injecting the electrolyte solution into the battery container, and sealing the battery container. The presently disclosed non-aqueous secondary battery is preferably a laminate type non-aqueous secondary battery that includes a laminate obtained through stacking of the positive electrode and the negative electrode with the separator in-between (i.e., without performing operations such as rolling and folding after stacking) from a viewpoint of increasing volume energy density while also further improving battery characteristics such as cycle characteristics and output characteristics. At least one member among the positive electrode, the negative electrode, and the separator is a functional layer-equipped member. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit formed through polymerization of a given monomer in the polymer is normally, unless otherwise specified, the same as the ratio (charging ratio) of the given monomer among all monomers used in polymerization of the polymer.

In the examples and comparative examples, the following methods were used to measure and evaluate the electrolyte solution elution amount of organic particles, the volume-average particle diameter of organic particles, inorganic particles, and a binder for a functional layer, the glass-transition temperature of organic particles and a binder for a functional layer, the blocking resistance and tear resistance of a battery member including a functional layer, the adhesiveness of a functional layer before and after electrolyte solution immersion, the deposition of lithium at an electrode surface, and the cycle characteristics and output characteristics of a secondary battery.

<Electrolyte Solution Elution Amount>

A film of 3±0.3 mm in thickness was produced by drying an obtained water dispersion of organic particles to remove water and then performing pressing for 2 minutes at 185° C. The produced film was cut into 5 mm squares to prepare film pieces. Approximately 1 g of these film pieces was precisely weighed out. The mass of the weighed-out film pieces was taken to be W0. The film pieces were immersed in 100 g of electrolyte solution (mixed solvent of EC, MEC, and DEC (EC/MEC/DEC (volume mixing ratio at 25° C.)=30/20/50)) for 24 hours at 60° C. Thereafter, these film pieces were pulled out of the electrolyte solution. The film pieces that had been pulled out were washed with methanol and then vacuum dried for 3 hours at 105° C. The weight W1 of the dried film pieces (mass of insoluble content) was measured. The electrolyte solution elution amount (%) of the organic particles was calculated by the following formula.

Electrolyte solution elution amount (%)=100−($W1/W0$)×100

<Volume-Average Particle Diameter>

[Organic Particles and Binder for Functional Layer (Particulate Polymer)]

A laser diffraction particle size distribution analyzer (SALD-7100 produced by Shimadzu Corporation) was used to measure a particle diameter distribution (volume basis) of organic particles or a binder for a functional layer (particulate polymer) in a water dispersion. In the measured particle diameter distribution, the particle diameter at which the cumulative volume calculated from a small-diameter end of the distribution reached 50% was taken to be the volume-average particle diameter (D50).

[Inorganic Particles]

Inorganic particles were dispersed in 0.2 mass % sodium hexametaphosphate aqueous solution and were subjected to 1 minute of ultrasonication to obtain a water dispersion. A particle diameter distribution (volume basis) was measured and the volume-average particle diameter (D50) was determined in the same way as described above for the organic particles and binder for a functional layer (particulate polymer) with the exception that this water dispersion was used.

<Glass-Transition Temperature>

A differential scanning calorimeter (EXSTAR DSC6220 produced by SIT NanoTechnology Inc.) was used to measure a DSC curve for organic particles or a binder for a functional layer in accordance with JIS K7121. Specifically, 10 mg of a dried measurement sample was weighed into an aluminum pan and then a DSC curve was measured in a measurement temperature range of −100° C. to 200° C. with a heating rate of 20° C./min and using an empty aluminum pan as a reference. The glass-transition temperature of the organic particles or binder for a functional layer was then determined from an intersection point of a base line directly before a heat absorption peak on the DSC curve at which a derivative signal (DDSC) was 0.05 mW/min/mg or more in a heating process and a tangent to the DSC curve at a first inflection point to appear after the heat absorption peak.

<Blocking Resistance>

A produced single-sided separator was cut into squares having a side length of 5 cm and squares having a side length of 4 cm to obtain two pairs of specimens. A sample in which the two specimens were simply stacked (non-pressed sample) and a sample in which the two specimens were stacked and then placed under pressure at a temperature of 40° C. and a pressure of 10 g/cm² (pressed sample) were prepared. These samples were subsequently left for 24 hours.

After each of the samples had been left for 24 hours, the adhesion state of the separators of the sample (blocking state) was checked and was evaluated by the following standard.

A: Adhesion of separators not observed for both non-pressed sample and pressed sample B: Adhesion of separators not observed for non-pressed sample, but observed for pressed sample <Tear Resistance>

A specimen was obtained by cutting out a rectangle of 150 mm in length and 28 mm in width from a produced double-sided separator (thickness of each functional layer: 1 μm). A notch that extended for a length of 50 mm in a length direction of the specimen was formed from the center of one of the short sides of the specimen. The split ends parts (width: 14 mm) of the specimen were fixed to upper and lower chucks of a TENSILON along roughly 10 mm thereof and then a tear test was carried out. Measurement was performed using a digital force gauge (ZTS-5N produced by Imada Co., Ltd.) and the chuck movement speed was 400 mm/min. The tear strength was calculated as the average load up until the chuck movement distance reached 60 mm. Tear resistance was evaluated by the following standard. A larger tear strength indicates better functional layer tear resistance.

A: Tear strength of 35 g·m/s² or more

B: Tear strength of at least 25 g·m/s² and less than 35 g·m/s²

C: Tear strength of at least 15 g·m/s² and less than 25 g·m/s²

D: Tear strength of less than 15 g·m/s²

<Adhesiveness Before Electrolyte Solution Immersion>

A produced single-sided positive electrode and a produced single-sided separator were each cut out to a width of 10 mm. One single-sided positive electrode and one single-single separator were stacked such that a functional layer of the separator and a positive electrode mixed material layer of the positive electrode faced one another and were then subjected to hot pressing for 6 minutes with a temperature of 85° C. and a pressure of 0.5 MPa to obtain a specimen. The specimen was placed with the surface at the current collector side of the positive electrode facing downward and cellophane tape was attached to the surface of the positive electrode. Tape prescribed by JIS Z1522 was used as the cellophane tape. The cellophane tape was affixed to a horizontal test stage beforehand. One end of the single-sided separator was pulled vertically upward at a pulling speed of 50 mm/min to peel off the separator and the stress during this peeling was measured. This measurement was made three times and an average value of the stress was determined. The average value was taken to be the peel strength P1. A larger peel strength P1 indicates better functional layer adhesiveness before electrolyte solution immersion.

A: Peel strength P1 of 20 N/m or more

B: Peel strength P1 of at least 15 N/m and less than 20 N/m

C: Peel strength P1 of at least 10 N/m and less than 15 N/m

D: Peel strength P1 of less than 10 N/m

<Adhesiveness after Electrolyte Solution Immersion>

A produced single-sided negative electrode and a produced single-sided separator were each cut out as a strip of 10 mm×100 mm. A negative electrode mixed material layer of the single-sided negative electrode was positioned along the surface of a functional layer of the single-sided separator and then hot pressing was performed for 6 minutes with a temperature of 85° C. and a pressure of 0.5 MPa to produce a laminate including the single-sided negative electrode and the single-sided separator. This laminate was used as a specimen.

The specimen was placed in a laminate packaging material with approximately 400 μL of electrolyte solution. Once 1 hour had passed, the specimen was pressed for 15 minutes together with the laminate packaging material at 60° C. and a pressure of 0.5 MPa. After this pressing, the specimen was stored for 1 day at a temperature of 60° C. A solution obtained by dissolving $LiPF_6$ with a concentration of 1 mol/L as a supporting electrolyte in a mixed solvent of EC, DEC, and vinylene carbonate (VC) (EC/DEC/VC (volume mixing ratio at 25° C.)=68.5/30/1.5) was used as the electrolyte solution.

Thereafter, the specimen was removed, and electrolyte solution attached to the surface thereof was wiped off. Next, the specimen was placed with the surface at the current collector side of the single-sided negative electrode facing downward and cellophane tape was attached to the surface of the single-sided negative electrode. Tape prescribed by JIS Z1522 was used as the cellophane tape. The cellophane tape was affixed to a horizontal test stage beforehand. One end of the single-sided separator was pulled vertically upward at a pulling speed of 50 mm/min to peel off the separator and the stress during this peeling was measured. This measurement was made three times, and an average value of the stress was determined as the peel strength P2 and was evaluated by the following standard. A larger peel strength P2 indicates better functional layer adhesiveness in electrolyte solution and stronger adhesion between a separator and an electrode.

A: Peel strength P2 of 5.0 N/m or more

B: Peel strength P2 of at least 3.0 N/m and less than 5.0 N/m

C: Peel strength P2 of at least 1.0 N/m and less than 3.0 N/m

D: Peel strength P2 of less than 1.0 N/m

<Lithium Deposition at Electrode Surface>

The rate of metal deposition on an electrode during charging of a secondary battery was measured as the lithium deposition area fraction on a negative electrode by the following method. Specifically, a produced lithium ion secondary battery was fully charged to a state of charge (SOC) of 100% by a 1 C constant current in a 20° C. environment. The fully charged secondary battery was disassembled to remove the negative electrode. The area fraction of lithium deposited on the surface of the negative electrode mixed material layer was calculated by the following formula.

Lithium deposition area fraction (%)=(Area of deposited lithium/Area of surface of negative electrode mixed material layer)×100

The lithium deposition area fraction was evaluated by the following standard. A smaller lithium deposition area fraction is more favorable for a secondary battery.

A: Lithium deposition area fraction of less than 2%

B: Lithium deposition area fraction of at least 2% and less than 5%

C: Lithium deposition area fraction of at least 5% and less than 10%

D: Lithium deposition area fraction of 10% or more

<Cycle Characteristics>

A produced lithium ion secondary battery was left at rest for 24 hours in a 25° C. environment. Next, the lithium ion secondary battery was subjected to a charge/discharge operation of charging to 4.35 V at a charge rate of 0.1 C and discharging to 2.75 V at a discharge rate of 0.1 C in a 25° C. environment. The initial capacity C0 of the lithium ion secondary battery was measured. The lithium ion secondary battery was then repeatedly subjected to the same charge/discharge operation in a 60° C. environment, and the capacity C1 of the lithium ion secondary battery after 1,000 cycles was measured.

The capacity maintenance rate $\Delta C$ (%) through this cycling ($\Delta C$ (%)=(C1/C0)×100%) was calculated and was evaluated by the following standard. A larger value for the capacity maintenance rate $\Delta C$ indicates that a secondary battery has better high-temperature cycle characteristics and a longer service life.

A: Capacity maintenance rate $\Delta C$ of 84% or more

B: Capacity maintenance rate $\Delta C$ of at least 80% and less than 84%

C: Capacity maintenance rate $\Delta C$ of at least 70% and less than 80%

D: Capacity maintenance rate $\Delta C$ of less than 70%

<Output Characteristics>

A produced lithium ion secondary battery was left at rest for 24 hours in a 25° C. environment. Next, the lithium ion secondary battery was subjected to an operation of charging for 5 hours at a charge rate of 0.1 C in a 25° C. environment, and the voltage V0 at this point was measured. The lithium ion secondary battery was then subjected to an operation of discharging at a discharge rate of 1 C in a −15° C. environment, and the voltage V1 at 15 seconds after the start of discharging was measured. The voltage change $\Delta V$ (=V0−V1) was determined and was evaluated by the following standard. A smaller voltage change $\Delta V$ indicates better secondary battery low-temperature output characteristics.

A: Voltage change $\Delta V$ of less than 350 mV

B: Voltage change $\Delta V$ of at least 350 mV and less than 500 mV

C: Voltage change $\Delta V$ of at least 500 mV and less than 600 mV

D: Voltage change $\Delta V$ of 600 mV or more

Example 1

<Production of Organic Particles>

A reactor equipped with a stirrer was charged with 10 parts of polystyrene particles (weight-average molecular weight: 17,000; average particle diameter: 0.21 µm) as seed particles, 4 parts of sodium dodecylbenzenesulfonate as an emulsifier, 70 parts of divinylbenzene as a crosslinkable monomer, 1 part of sodium persulfate as a polymerization initiator, and 800 parts of deionized water. Thereafter, these materials were polymerized for 1 hour at 80° C. under stirring while blowing in nitrogen gas. Next, 0.5 parts of sodium persulfate as a polymerization initiator, 15 parts of styrene as an aromatic monovinyl monomer, 4.5 parts of methacrylic acid as an acid group-containing monomer, 0.5 parts of 2-hydroxyethyl methacrylate as a hydroxy group-containing monomer, 1 part (in terms of solid content) of a 2.5% aqueous solution of polyvinyl alcohol (degree of polymerization: 2,000; degree of saponification: 87 to 89) as a dispersion stabilizer, and 20 parts of deionized water were mixed to prepare an emulsion. This emulsion was continuously added into the reactor over 3 hours at 80° C., and polymerization was completed to obtain organic particles. The volume-average particle diameter $D_A$ and glass-transition temperature of the obtained organic particles were measured. The organic particles were confirmed to have a glass-transition temperature of 100° C. or higher. The measurement result for the volume-average particle diameter $D_A$ is shown in Table 1.

<Production of Particulate Polymer (Binder for Functional Layer)>

A reactor equipped with a stirrer was charged with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate. The gas phase inside the reactor was purged with nitrogen gas and the temperature was raised to 60° C.

A monomer composition was obtained in a separate vessel by mixing 50 parts of deionized water, 0.5 parts of sodium dodecylbenzenesulfonate as an emulsifier, 58.2 parts of 2-ethylhexyl acrylate as a (meth)acrylic acid ester monomer, 40 parts of styrene as an aromatic monovinyl monomer, 0.8 parts of itaconic acid as an acid group-containing monomer, and 1.0 parts of ethylene glycol dimethacrylate as a crosslinkable monomer. The monomer composition was continuously added to the reactor over 4 hours to carry out polymerization. The reaction was carried out at 60° C. during the addition. Once the addition was completed, stirring was carried out for a further 3 hours at 70° C. to complete the reaction and yield a water dispersion containing a particulate polymer (acrylic polymer). The volume average particle diameter $D_B$ and glass-transition temperature of the obtained particulate polymer were measured. The results are shown in Table 1.

<Production of Composition for Functional Layer>

A crude dispersion liquid was obtained by adding 2.5 parts of a polycarboxylic acid-type dispersant (SN DISPERSANT 5020 produced by San Nopco Limited) to 100 parts of barium sulfate particles (volume-average particle diameter: 0.6 µm; specific surface area: 6.0 m²/g) used as inorganic particles, and then adding water to adjust the solid content concentration to 50%. This crude dispersion liquid was passed twice through a media-less disperser (produced by IKA Japan K.K.; product name: Inline mill MKO) to perform dispersion treatment and prepare a water dispersion of barium sulfate particles.

Mixing and dispersing were then performed of 5 parts (in terms of solid content) of the water dispersion of the barium sulfate particles used as inorganic particles and 7 parts (in terms of solid content) of the water dispersion of the particulate polymer used as a binder for a functional layer with deionized water. Next, 93 parts (in terms of solid content) of the previously described water dispersion of organic particles and 0.2 parts of a polyethylene glycol-type surfactant (produced by San Nopco Limited; product name: SAN NOPCO® SN WET 366 (SAN NOPCO is a registered trademark in Japan, other countries, or both)) as a wetting agent were further mixed, and the solid content concentration was adjusted to 40% to obtain a composition for a functional layer.

<Production of Functional Layer and Functional Layer-Equipped Separator>

An organic separator substrate made from polyethylene (produced by successive biaxial stretching; thickness: 7 μm; made from polyethylene composition containing 40 mass % of ultra-high molecular weight polyethylene having Mw of $2.4×10^6$ and 60 mass % of high-density polyethylene having Mw of $2.6×10^5$) was prepared as a separator substrate. The composition for a functional layer obtained as described above was applied onto one side of the prepared organic separator substrate and was dried for 10 minutes at 60° C. In this manner, a separator including a functional layer (thickness: 1 μm) at one side thereof (single-sided separator) was obtained.

The composition for a functional layer obtained as described above was also applied onto both sides of another organic separator substrate that was prepared in the same manner and was dried for 10 minutes at 60° C. In this manner, a separator including a functional layer (thickness: 1 μm) at each side thereof (double-sided separator) was obtained.

The obtained single-sided and double-sided separators were used to evaluate blocking resistance, tear resistance, and adhesiveness before and after electrolyte solution immersion. The results are shown in Table 1.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution. The mixture was then subjected to thermal-vacuum distillation to remove unreacted monomer and was subsequently cooled to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a water-soluble polymer, and deionized water were mixed. These materials were adjusted to a solid content concentration of 68% and were then mixed for 60 minutes at 25° C. Mixing was performed for a further 15 minutes at 25° C. after adjusting the solid content concentration to 62% using deionized water. Thereafter, 1.5 parts in terms of solid content of the previously described binder for a negative electrode mixed material layer and deionized water were added to the resultant mixture. The mixture was adjusted to a final solid content concentration of 52% and was further mixed for 10 minutes. The resultant mixture was subjected to a defoaming process under reduced pressure to yield a slurry composition for a secondary battery negative electrode having good fluidity.

The obtained slurry composition for a negative electrode was applied onto copper foil (current collector) of 20 μm in thickness using a comma coater such as to have a film thickness of approximately 150 μm after drying. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness (single-sided negative electrode).

In addition, application was performed in the same way on a rear surface of the pre-pressing negative electrode web described above to form negative electrode mixed material layers at both sides, and rolling was performed by roll pressing to obtain a post-pressing negative electrode including negative electrode mixed material layers of 80 μm each in thickness (double-sided negative electrode).

<Production of Positive Electrode>

A mixture of 100 parts of $LiCoO_2$ having a volume-average particle diameter of 12 μm as a positive electrode active material, 2 parts of acetylene black (HS-100 produced by Denki Kagaku Kogyo Kabushiki Kaisha) as a conductive material, 2 parts in terms of solid content of polyvinylidene fluoride (#7208 produced by Kureha Corporation) as a binder for a positive electrode mixed material layer, and N-methylpyrrolidone was prepared and was adjusted to a total solid content concentration of 70%. These materials were mixed to produce a slurry composition for a positive electrode.

The obtained slurry composition for a positive electrode was applied onto aluminum foil (current collector) of 20 μm in thickness using a comma coater such as to have a film thickness of approximately 150 μm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a pre-pressing positive electrode web. The pre-pressing positive electrode web was rolled by roll pressing to obtain a post-pressing positive electrode including a positive electrode mixed material layer of 80 μm in thickness (single-sided positive electrode).

In addition, application was performed in the same way on a rear surface of the pre-pressing positive electrode web described above to form positive electrode mixed material layers at both sides, and rolling was performed by roll pressing to obtain a post-pressing positive electrode including positive electrode mixed material layers of 80 μm each in thickness (double-sided positive electrode).

<Production of Secondary Battery>

The obtained single-sided positive electrode was cut out to 5 cm×15 cm and then a double-sided separator that had been cut out to 6 cm×16 cm was positioned thereon (mixed material layer side) such that one of the functional layers of the separator faced toward the single-sided positive electrode. A double-sided negative electrode that had been cut out to 5.5 cm×15.5 cm was positioned at the side of the other functional layer of the double-sided separator to obtain a laminate A. A double-sided separator that had been cut out to 6 cm×16 cm was positioned at the double-sided negative electrode side of the laminate A such that one of the functional layers of the separator faced toward the double-sided negative electrode. A double-sided positive electrode that had been cut out to 5 cm×15 cm was stacked at the side of the other functional layer of the double-sided separator. Next, a double-sided separator that had been cut out to 6 cm×16 cm was positioned on the double-sided positive electrode such that one of the functional layers of the separator faced toward the double-sided positive electrode. Finally, a single-sided negative electrode that had been cut out to 5.5 cm×5.5 cm was stacked on the other functional layer of the double-sided separator such that the negative electrode mixed material layer faced toward the functional layer of the double-sided separator to thereby obtain a laminate B. The laminate B was enclosed in an aluminum packing case serving as a battery case. An electrolyte solution (solution obtained by dissolving $LiPF_6$ with a concentration of 1 mol/L as a supporting electrolyte in a mixed solvent of EC, DEC, and VC (EC/DEC/VC (volume ratio at 25° C.)=68.5/30/1.5)) was injected into the aluminum packing case such that air did not remain. The aluminum packing case was then closed by heat sealing at 150° C. The resultant battery package was flat pressed for 2 minutes at 100° C. and 100 kgf to produce a 1,000 mAh laminate-type lithium ion secondary battery.

The obtained secondary battery was used to evaluate lithium deposition at an electrode surface, cycle characteristics, and output characteristics. The results are shown in Table 1.

Examples 2 and 3

Organic particles, a particulate polymer (binder for functional layer), a composition for a functional layer, a separator, a positive electrode, a negative electrode, and a secondary battery were produced in the same way as in Example 1 with the exception that the chemical composition of the organic particles and the amount of the inorganic particles (not used in Example 3) were changed as shown in Table 1. Each evaluation was performed in the same way as in Example 1. The results are shown in Table 1. The organic particles used in Example 2 and the organic particles used in Example 3 were confirmed to both have a glass-transition temperature of 100° C. or higher.

Example 4

A particulate polymer (binder for functional layer), a composition for a functional layer, a separator, a positive electrode, a negative electrode, and a secondary battery were produced in the same way as in Example 1 with the exception that the amount of the inorganic particles was changed as shown in Table 1 and organic particles produced as described below were used. Each evaluation was performed in the same way as in Example 1. The results are shown in Table 1. The organic particles used in Example 4 were confirmed to have a glass-transition temperature of 100° C. or higher.
<Production of Organic Particles>

Organic particles were obtained by charging 55 parts of divinylbenzene as a crosslinkable monomer, 45 parts of ethylvinylbenzene as an aromatic monovinyl monomer, 22 parts of polyvinyl pyrrolidone as a dispersion stabilizer, 10 parts of 2,2'-azobisisobutyronitrile and 4.5 parts of benzoyl peroxide as polymerization initiators, and 1,300 parts of methyl alcohol to a reactor equipped with a stirrer, and completing polymerization under stirring for 28 hours at 73° C. in a nitrogen gas atmosphere. The polymerization conversion rate in this polymerization reaction was 96%. Methyl alcohol in the resultant methyl alcohol dispersion was replaced with deionized water.

Example 5

A particulate polymer (binder for functional layer), a composition for a functional layer, a separator, a positive electrode, a negative electrode, and a secondary battery were produced in the same way as in Example 1 with the exception that the amount of the inorganic particles was changed as shown in Table 1 and organic particles produced as described below were used. Each evaluation was performed in the same way as in Example 1. The results are shown in Table 1. The organic particles used in Example 5 were confirmed to have a glass-transition temperature of 100° C. or higher.
<Production of Organic Particles>

Organic particles were obtained by charging 70 parts of divinylbenzene as a crosslinkable monomer, 25 parts of styrene as an aromatic monovinyl monomer, 2 parts of n-butyl acrylate as a (meth)acrylic acid ester monomer, 3 parts of methacrylic acid as an acid group-containing monomer, 1 part of sodium persulfate as a polymerization initiator, 6 parts of sodium dodecylbenzenesulfonate as an emulsifier, and 900 parts of deionized water to a reactor equipped with a stirrer, and then carrying out polymerization under stirring for 1 hour at 80° C.

Example 6

Organic particles, a particulate polymer (binder for functional layer), a composition for a functional layer, single and double-sided separators, a positive electrode, a negative electrode, and a secondary battery were produced in the same way as in Example 5 with the exception that in production of the organic particles, the chemical composition of the organic particles was changed as shown in Table 1, polyvinyl alcohol was not used as a dispersion stabilizer, and the amount of sodium dodecylbenzenesulfonate used as an emulsifier was changed to 1.5 parts. Each evaluation was performed in the same way as in Example 1. The results are shown in Table 1. The organic particles used in Example 6 were confirmed to have a glass-transition temperature of 100° C. or higher.

Examples 7 and 8

A particulate polymer (binder for functional layer), a composition for a functional layer, a separator, a positive electrode, a negative electrode, and a secondary battery were produced in the same way as in Example 6 with the exception that organic particles produced as described below were used and the amounts of the organic particles, the inorganic particles, and the binder for a functional layer were changed as shown in Table 1. Each evaluation was performed in the same way as in Example 1. The results are shown in Table 1. The organic particles used in Examples 7 and 8 were confirmed to have a glass-transition temperature of 100° C. or higher.
<Production of Organic Particles>

A reactor equipped with a stirrer was charged with 10 parts of polystyrene particles (weight-average molecular weight: 17,000; average particle diameter: 0.21 μm) as seed particles, 7.5 parts (in terms of solid content) of a 2.5% aqueous solution of polyvinyl alcohol (degree of polymerization: 2,000; degree of saponification: 87 to 89) as a dispersion stabilizer, 50 parts of methyl methacrylate as a (meth)acrylic acid ester monomer, and 40 parts of trimethylolpropane trimethacrylate as a crosslinkable monomer, and then these materials were heated and subjected to polymerization for 8 hours at 65° C. The polymerization conversion rate was 99% and almost no coagulated material was produced.

Example 9

Organic particles, a particulate polymer (binder for functional layer), a composition for a functional layer, a separator, a positive electrode, a negative electrode, and a secondary battery were produced in the same way as in Example 6 with the exception that the amount of the inorganic particles was changed as shown in Table 1 and the amount of sodium lauryl sulfate used as an emulsifier in production of the particulate polymer (binder for functional layer) was changed to 0.1 parts. Each evaluation was performed in the same way as in Example 1. The results are shown in Table 1.

Example 10

Organic particles, a particulate polymer (binder for functional layer), a composition for a functional layer, a separator, a positive electrode, a negative electrode, and a secondary battery were produced in the same way as in Example 6 with the exception that the amount of sodium lauryl sulfate used as an emulsifier in production of the organic particles was changed to 6 parts and the amount of sodium lauryl sulfate used as an emulsifier in production of the particulate polymer (binder for functional layer) was changed to 0.8 parts. Each evaluation was performed in the same way as in Example 1. The results are shown in Table 1.

Examples 11 and 12

Organic particles, a particulate polymer (binder for functional layer), a composition for a functional layer, a separator, a positive electrode, a negative electrode, and a secondary battery were produced in the same way as in Example 1 with the exception that in production of the composition for a functional layer, alumina particles (volume-average particle diameter: 0.8 μm) or boehmite particles (volume-average particle diameter: 0.9 μm) were used instead of barium sulfate particles as the inorganic particles and the amount of the inorganic particles was changed as shown in Table 1. Each evaluation was performed in the same way as in Example 1. The results are shown in Table 1.

Comparative Examples 1 and 2

Organic particles, a particulate polymer (binder for functional layer), a composition for a functional layer, a separator, a positive electrode, a negative electrode, and a secondary battery were produced in the same way as in Example 1 with the exception that the chemical composition of the organic particles was changed as shown in Table 1 and, in production of the composition for a functional layer, alumina particles (volume-average particle diameter: 0.8 μm) were used instead of barium sulfate particles as the inorganic particles and the amount of the inorganic particles was changed as shown in Table 1. Each evaluation was performed in the same way as in Example 1. The results are shown in Table 1.

In Table 1, shown below:
"DVB" indicates divinylbenzene unit;
"TMPT" indicates trimethylolpropane trimethacrylate unit;
"EDMA" indicates ethylene glycol dimethacrylate unit;
"ST" indicates styrene unit;
"EVB" indicates ethylvinylbenzene unit;
"BA" indicates n-butyl acrylate unit;
"MMA" indicates methyl methacrylate unit;
"MAA" indicates methacrylic acid unit;
"2HEMA" indicates 2-hydroxyethyl methacrylate unit;
"PST" indicates polystyrene;
"PVA" indicates polyvinyl alcohol;
"PVP" indicates polyvinyl pyrrolidone; and
"ACL" indicates acrylic polymer.

TABLE 1

| | | | | | Example 1 | Example 2 | Example 3 | Example 4 | Example 5 |
|---|---|---|---|---|---|---|---|---|---|
| Composition for functional layer | Organic particles | Chemical composition | Crosslinkable monomer unit [mass %] | DVB | 70 | 7 | 78 | 55 | 70 |
| | | | | TMPT | 13 | — | — | — | — |
| | | | | EDMA | — | — | — | — | — |
| | | | Other monomer units [mass %] | ST | 15 | 78 | 7 | — | 25 |
| | | | | ST (originating from seed particles) | 10 | 10 | 10 | — | — |
| | | | | EVB | — | — | — | 45 | — |
| | | | | BA | — | — | — | — | 2 |
| | | | | MMA | — | — | — | — | — |
| | | | | MAA | 4.5 | 4.5 | 4.5 | — | 3 |
| | | | | 2HEMA | 0.5 | 0.5 | 0.5 | — | — |
| | | Seed particles | | | PST | PST | PST | — | — |
| | | Dispersion stabilizer [parts by mass per 100 parts by mass of monomer] | | PVA | 1 | 1 | 1 | — | — |
| | | | | PVP | — | — | — | 22 | — |
| | | Electrolyte solution elution amount [mass %] | | | 0.8 | 3.7 | 0.004 | 1 | 1.2 |
| | | Volume-average particle diameter $D_A$ [μm] | | | 0.4 | 0.4 | 0.4 | 0.95 | 0.03 |
| | | Content [parts by mass] | | | 93 | 93 | 93 | 93 | 93 |
| | Binder for functional layer | Type | | | ACL | ACL | ACL | ACL | ACL |
| | | Volume-average particle diameter $D_B$ [μm] | | | 0.3 | 0.3 | 0.3 | 0.3 | 0.3 |
| | | Glass-transition temperature [° C.] | | | −15 | −15 | −15 | −15 | −15 |
| | | Content [parts by mass] | | | 7 | 7 | 7 | 7 | 7 |
| | Proportion of organic particles among organic particles + binder for functional layer [mass %] | | | | 93 | 93 | 93 | 93 | 93 |
| | Comparison of $D_A$ and $D_B$ | | | | $D_A > D_B$ | $D_A > D_B$ | $D_A > D_B$ | $D_A > D_B$ | $D_A < D_B$ |
| | Inorganic particles | Type | | | Barium sulfate | Barium sulfate | — | Barium sulfate | Barium sulfate |
| | | Volume-average particle diameter [μm] | | | 0.6 | 0.6 | — | 0.6 | 0.6 |
| | | Content [parts by mass] | | | 5 | 10 | — | 10 | 15 |
| | Functional layer thickness [μm] | | | | 1 | 1 | 1 | 1 | 1 |

TABLE 1-continued

| Evaluation | | | | | | | | | | |
|---|---|---|---|---|---|---|---|---|---|---|
| | Tear resistance | | | | | A | A | A | A | B |
| | Adhesiveness before electrolyte solution immersion | | | | | A | A | A | B | A |
| | Lithium deposition | | | | | A | A | A | A | B |
| | Adhesiveness after electrolyte solution immersion | | | | | A | B | A | A | A |
| | Cycle characteristics | | | | | A | B | A | A | B |
| | Output characteristics | | | | | A | A | B | B | B |
| | Blocking resistance | | | | | A | B | A | A | B |

| | | | | | Example 6 | Example 7 | Example 8 | Example 9 | Example 10 |
|---|---|---|---|---|---|---|---|---|---|
| Composition for functional layer | Organic particles | Chemical composition | Crosslinkable monomer unit [mass %] | DVB | 35 | — | — | 35 | 35 |
| | | | | TMPT | — | 40 | 40 | — | — |
| | | | | EDMA | — | — | — | — | — |
| | | | Other monomer units [mass %] | ST | 25 | — | — | 25 | 25 |
| | | | | ST (originating from seed particles) | — | 10 | 10 | — | — |
| | | | | EVB | 35 | — | — | 35 | 35 |
| | | | | BA | 2 | — | — | 2 | 2 |
| | | | | MMA | — | 50 | 50 | — | — |
| | | | | MAA | 3 | — | — | 3 | 3 |
| | | | | 2HEMA | — | — | — | — | — |
| | | | Seed particles | | — | PST | PST | — | — |
| | | | Dispersion stabilizer [parts by mass per 100 parts by mass of monomer] | PVA | — | 7.5 | 7.5 | — | — |
| | | | | PVP | — | — | — | — | — |
| | | | Electrolyte solution elution amount [mass %] | | 1.5 | 0.7 | 0.7 | 1.5 | 1.5 |
| | | | Volume-average particle diameter $D_A$ [µm] | | 0.4 | 0.4 | 0.4 | 0.4 | 0.03 |
| | | | Content [parts by mass] | | 93 | 75 | 30 | 93 | 93 |
| | Binder for functional layer | | Type | | ACL | ACL | ACL | ACL | ACL |
| | | | Volume-average particle diameter $D_B$ [µm] | | 0.3 | 0.3 | 0.3 | 0.4 | 0.03 |
| | | | Glass-transition temperature [° C.] | | −15 | −15 | −15 | −15 | −15 |
| | | | Content [parts by mass] | | 7 | 25 | 70 | 7 | 7 |
| | | | Proportion of organic particles among organic particles + binder for functional layer [mass %] | | 93 | 75 | 30 | 93 | 93 |
| | | | Comparison of $D_A$ and $D_B$ | | $D_A > D_B$ | $D_A > D_B$ | $D_A > D_B$ | $D_A = D_B$ | $D_A = D_B$ |
| | Inorganic particles | | Type | | Barium sulfate | Barium sulfate | Barium sulfate | Barium sulfate | Barium sulfate |
| | | | Volume-average particle diameter [µm] | | 0.6 | 0.6 | 0.6 | 0.6 | 0.6 |
| | | | Content [parts by mass] | | 15 | 5 | 10 | 10 | 15 |
| | | | Functional layer thickness [µm] | | 1 | 1 | 1 | 1 | 1 |
| Evaluation | | | Tear resistance | | B | A | A | B | B |
| | | | Adhesiveness before electrolyte solution immersion | | A | A | A | B | A |
| | | | Lithium deposition | | B | A | B | A | B |
| | | | Adhesiveness after electrolyte solution immersion | | B | A | A | B | B |
| | | | Cycle characteristics | | B | A | B | A | B |
| | | | Output characteristics | | B | A | B | A | B |
| | | | Blocking resistance | | B | A | B | B | B |

| | | | | | Example 11 | Example 12 | Comparative Example 1 | Comparative Example 2 |
|---|---|---|---|---|---|---|---|---|
| Composition for functional layer | Organic particles | Chemical composition | Crosslinkable monomer unit [mass %] | DVB | 70 | 70 | — | 90 |
| | | | | TMPT | — | — | — | — |
| | | | | EDMA | — | — | 1 | — |
| | | | Other monomer units [mass %] | ST | 15 | 15 | 50 | 7 |
| | | | | ST (originating from seed particles) | 10 | 10 | — | — |
| | | | | EVB | — | — | — | — |
| | | | | BA | — | — | — | — |
| | | | | MMA | — | — | 46 | — |
| | | | | MAA | 4.5 | 4.5 | 3 | 3 |
| | | | | 2HEMA | 0.5 | 0.5 | — | — |
| | | | Seed particles | | PST | PST | — | — |
| | | | Dispersion stabilizer [parts by mass per 100 parts by mass of monomer] | PVA | 1 | 1 | — | — |
| | | | | PVP | — | — | — | — |
| | | | Electrolyte solution elution amount [mass %] | | 0.8 | 0.8 | 5.5 | 0 |
| | | | Volume-average particle diameter $D_A$ [µm] | | 0.4 | 0.4 | 0.4 | 0.4 |
| | | | Content [parts by mass] | | 93 | 93 | 93 | 93 |
| | Binder for functional layer | | Type | | ACL | ACL | ACL | ACL |
| | | | Volume-average particle diameter $D_B$ [µm] | | 0.3 | 0.3 | 0.3 | 0.3 |
| | | | Glass-transition temperature [° C.] | | −15 | −15 | −15 | −15 |
| | | | Content [parts by mass] | | 7 | 7 | 7 | 7 |
| | | | Proportion of organic particles among organic particles + binder for functional layer [mass %] | | 93 | 93 | 93 | 93 |
| | | | Comparison of $D_A$ and $D_B$ | | $D_A > D_B$ | $D_A > D_B$ | $D_A > D_B$ | $D_A > D_B$ |

TABLE 1-continued

| | | | | | | |
|---|---|---|---|---|---|---|
| | Inorganic particles | Type | Alumina | Boehmite | Alumina | Alumina |
| | | Volume-average particle diameter [μm] | 0.8 | 0.9 | 0.8 | 0.8 |
| | | Content [parts by mass] | 10 | 10 | 10 | 10 |
| | | Functional layer thickness [μm] | 1 | 1 | 1 | 1 |
| Evaluation | | Tear resistance | A | A | C | C |
| | | Adhesiveness before electrolyte solution immersion | A | A | B | B |
| | | Lithium deposition | A | A | B | B |
| | | Adhesiveness after electrolyte solution immersion | A | A | D | B |
| | | Cycle characteristics | A | A | D | B |
| | | Output characteristics | A | A | B | D |
| | | Blocking resistance | A | A | B | B |

It can be seen from Table 1 that in Examples 1 to 12 in which a composition for a functional layer containing a binder for a functional layer and organic particles having an electrolyte solution elution amount within a specific range was used, blocking of a separator including a functional layer and deposition of lithium at an electrode were sufficiently inhibited, and a functional layer having excellent tear resistance and adhesiveness before and after immersion in electrolyte solution and a secondary battery having excellent cycle characteristics and output characteristics were obtained. It can also be seen from Table 1 that in Comparative Example 1 in which a composition for a functional layer containing a binder for a functional layer and organic particles having an electrolyte solution elution amount of more than 5.0 mass % was used, functional layer tear resistance, functional layer adhesiveness after immersion in electrolyte solution, and secondary battery cycle characteristics deteriorated. It can also be seen from Table 1 that in Comparative Example 2 in which a composition for a functional layer containing a binder for a functional layer and organic particles having an electrolyte solution elution amount of less than 0.001 mass % was used, functional layer tear resistance and secondary battery output characteristics deteriorated.

INDUSTRIAL APPLICABILITY

According to the present disclosure, it is possible to provide a composition for a non-aqueous secondary battery functional layer capable of forming a functional layer for a non-aqueous secondary battery that has excellent adhesiveness after immersion in electrolyte solution and can cause a non-aqueous secondary battery to display excellent cycle characteristics and output characteristics.

Moreover, according to the present disclosure, it is possible to provide a functional layer for a non-aqueous secondary battery that can cause a non-aqueous secondary battery to display excellent cycle characteristics and output characteristics.

Furthermore, according to the present disclosure, it is possible to provide a non-aqueous secondary battery having excellent cycle characteristics and output characteristics.

Also, according to the present disclosure, it is possible to provide a method of producing an electrode for a non-aqueous secondary battery that can cause a non-aqueous secondary battery to display excellent cycle characteristics and output characteristics.

The invention claimed is:

1. A composition for a non-aqueous secondary battery functional layer comprising organic particles and a binder for a functional layer, wherein
   the organic particles have an electrolyte solution elution amount of at least 0.001 mass % and not more than 5.0 mass %, and
   the organic particles include a crosslinkable monomer unit in a proportion of at least 10 mass % and not more than 85 mass %.

2. The composition for a non-aqueous secondary battery functional layer according to claim 1, wherein the organic particles have a volume-average particle diameter $D_A$ of at least 0.01 μm and not more than 2.0 μm.

3. The composition for a non-aqueous secondary battery functional layer according to claim 1, wherein content of the organic particles is at least 1 mass % and not more than 99 mass % of total content of the organic particles and the binder for a functional layer.

4. The composition for a non-aqueous secondary battery functional layer according to claim 1, wherein volume-average particle diameter $D_A$ of the organic particles is greater than or equal to volume-average particle diameter $D_B$ of the binder for a functional layer.

5. The composition for a non-aqueous secondary battery functional layer according to claim 1, further comprising inorganic particles.

6. A functional layer for a non-aqueous secondary battery formed using the composition for a non-aqueous secondary battery functional layer according to claim 1.

7. A non-aqueous secondary battery comprising the functional layer for a non-aqueous secondary battery according to claim 6.

8. The non-aqueous secondary battery according to claim 7, wherein the non-aqueous secondary battery is a laminate type.

9. A method of producing an electrode for a non-aqueous secondary battery comprising:
   stacking the functional layer for a non-aqueous secondary battery according to claim 6 and an electrode substrate; and
   adhering the functional layer for a non-aqueous secondary battery and the electrode substrate through pressing.

10. The method of producing an electrode for a non-aqueous secondary battery according to claim 9, wherein
   the electrode substrate contains a binder for an electrode mixed material layer, and
   the binder for an electrode mixed material layer includes an aromatic vinyl monomer unit and an aliphatic conjugated diene monomer unit.

* * * * *